(12) United States Patent
Molchanov et al.

(10) Patent No.: US 10,157,309 B2
(45) Date of Patent: Dec. 18, 2018

(54) ONLINE DETECTION AND CLASSIFICATION OF DYNAMIC GESTURES WITH RECURRENT CONVOLUTIONAL NEURAL NETWORKS

(71) Applicant: NVIDIA Corporation, Santa Clara, CA (US)

(72) Inventors: Pavlo Molchanov, San Jose, CA (US); Xiaodong Yang, San Jose, CA (US); Shalini De Mello, San Francisco, CA (US); Kihwan Kim, Sunnyvale, CA (US); Stephen Walter Tyree, St. Louis, MO (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 45 days.

(21) Appl. No.: 15/402,128

(22) Filed: Jan. 9, 2017

(65) Prior Publication Data

US 2017/0206405 A1    Jul. 20, 2017

Related U.S. Application Data

(60) Provisional application No. 62/278,924, filed on Jan. 14, 2016.

(51) Int. Cl.
| | |
|---|---|
| *G06K 9/00* | (2006.01) |
| *G06K 9/62* | (2006.01) |
| *G06N 3/04* | (2006.01) |
| *G06N 3/08* | (2006.01) |

(52) U.S. Cl.
CPC ....... *G06K 9/00355* (2013.01); *G06K 9/6251* (2013.01); *G06K 9/6256* (2013.01); *G06K 9/6277* (2013.01); *G06N 3/0445* (2013.01); *G06N 3/0454* (2013.01); *G06N 3/084* (2013.01)

(58) Field of Classification Search
CPC ............ G06K 9/00355; G06K 9/6251; G06K 9/6256; G06K 9/6277; G06N 3/0445; G06N 3/0454; G06N 3/084
See application file for complete search history.

(56) References Cited

U.S. PATENT DOCUMENTS

| | | | | |
|---|---|---|---|---|
| 8,345,984 | B2* | 1/2013 | Ji | G06K 9/4628 |
| | | | | 382/103 |
| 9,589,365 | B2* | 3/2017 | Zhao | G06K 9/00348 |
| 9,904,874 | B2* | 2/2018 | Shoaib | G06K 9/66 |
| 2016/0379109 | A1* | 12/2016 | Chung | G06N 3/04 |
| | | | | 706/26 |

OTHER PUBLICATIONS

U.S. Appl. No. 15/060,525, filed Mar. 3, 2016.
(Continued)

*Primary Examiner* — Tom Y Lu
(74) *Attorney, Agent, or Firm* — Zilka-Kotab, P.C.

(57) ABSTRACT

A method, computer readable medium, and system are disclosed for detecting and classifying hand gestures. The method includes the steps of receiving an unsegmented stream of data associated with a hand gesture, extracting spatio-temporal features from the unsegmented stream by a three-dimensional convolutional neural network (3DCNN), and producing a class label for the hand gesture based on the spatio-temporal features.

20 Claims, 11 Drawing Sheets

(56) References Cited

OTHER PUBLICATIONS

U.S. Appl. No. 62/127,759, filed Mar. 3, 2015.
Escalera, et al, "ChaLearn Looking at People Challenge 2014: Dataset and Results," ECCV 2014 Workshops, 2014, pp. 1-15.
Graves, A., "Supervised Sequence Labelling with Recurrent Neural Networks," Springer Berlin Heidelberg, 2012, pp. 1-124.
Graves et al.,"Connectionist temporal classification: labelling unsegmented sequence data with recurrent neural networks," Proceedings of the 23rd international conference on Machine learning, ACM, 2006, pp. 1-8.
Hinton et al., "Improving neural networks by preventing co-adaptation of feature detectors," arXiv, 2012, pp. 1-18.
Karpathy et al., "Large-scale Video Classification with Convolutional Neural Networks," Proceedings of the IEEE conference on Computer Vision and Pattern Recognition, 2014, pp. 1-8.
Ohn-Bar et al., "Hand gesture recognition in real time for automotive interfaces: A multimodal vision-based approach and evaluations," IEEE Trans. on Intelligent Transportation Systems, vol. 15, No. 6, 2014, pp. 1-10.
Pascanu et al., "On the difficulty of training recurrent neural networks," ICML, vol. 3, No. 28, 2013, pp. 1-9.
Tran et al., "Learning Spatiotemporal Features with 3D Convolutional Networks," ICCV, 2015, pp. 1-16.
Werbos, P., "Backpropagation Through Time: What It Does and How to Do It," Proceedings of the IEEE, vol. 78, No. 10, Oct. 1990, pp. 1550-1560.
Simonyan et al., "Very Deep Convolutional Networks for Large-Scale Image Recognition," ICLR, 2015, pp. 1-14.
Simonyan et al., "Two-Stream Convolutional Networks for Action Recognition in Videos," Advances in neural information processing systems, 2014, pp. 1-9.
Yang et al., "Super Normal Vector for Activity Recognition Using Depth Sequences," Proceedings of the IEEE conference on Computer Vision and Pattern Recognition, 2014, pp. 1-8.

\* cited by examiner

ONLINE DETECTION AND CLASSIFICATION OF DYNAMIC GESTURES WITH RECURRENT CONVOLUTIONAL NEURAL NETWORKS

CLAIM OF PRIORITY

This application claims the benefit of U.S. Provisional Application No. 62/278,924 titled "ONLINE DETECTION AND CLASSIFICATION OF DYNAMIC HAND GESTURES WITH CONVOLUTIONAL NEURAL NETWORKS," filed Jan. 14, 2016, the entire contents of which is incorporated herein by reference.

FIELD OF THE INVENTION

The present invention relates to gesture recognition, and more particularly to gesture recognition using recurrent convolutional neural networks.

BACKGROUND

Hand gestures and gesticulations are a common form of human communication. It is therefore natural for humans to use this form of communication to interact with machines as well. For instance, touch-less human computer interfaces in vehicles can improve comfort and safety. Recently, deep convolutional neural networks (CNN) receiving video sequences of gestures as inputs have proven to be an effective algorithm for gesture recognition, and have significantly advanced the accuracy of dynamic hand gesture and action recognition tasks. CNNs are also useful for optimally combining the input data from multiple sensors (multi-modal data) for gesture recognition in challenging lighting conditions. However, real world systems for dynamic hand gesture recognition present numerous open challenges that are yet to be addressed.

First, the systems receive continuous streams of unprocessed visual data, where gestures known to the system must be simultaneously detected and classified. Conventional systems, typically regard gesture segmentation and classification separately. Two classifiers, a detection classifier to distinguish between "gesture and "no gesture", and a recognition classifier to identify the specific gesture type, are often trained separately and applied in sequence to the input data streams. There are two reasons for this: (1) to compensate for variability in the duration of gestures and (2) to reduce noise due to unknown hand motions in the "no gesture" class thereby simplifying the task of the recognition classifier. However, processing the visual data with a detection classifier limits the accuracy that is achievable by the system to the accuracy of the upstream gesture detection classifier.

Second, dynamic hand gestures generally contain three temporally overlapping phases: preparation, nucleus, and retraction, of which the nucleus is the most discriminatory. The other two phases can be quite similar for different gestures and hence less useful or even detrimental to accurate gesture classification. Therefore, classifiers often rely primarily on the nucleus phase for gesture classification.

Finally, humans are acutely perceptive of the response time of user interfaces, with lags greater than 100 ms perceived as annoying. This presents the additional challenge of detecting and classifying gestures immediately upon (or preferably before) completion of the gesture to provide immediate feedback to users. There is a need for addressing these issues and/or other issues associated with the prior art.

SUMMARY

A method, computer readable medium, and system are disclosed for detecting and classifying hand gestures. The method includes the steps of receiving an unsegmented stream of data associated with a hand gesture, extracting spatio-temporal features from the unsegmented stream by a three-dimensional convolutional neural network (3D-CNN), and producing a class label for the hand gesture based on the spatio-temporal features. In one embodiment, a recurrent 3D-CNN (R3DCNN) is used to extract the spatio-temporal features from the unsegmented stream and produce the class label for the hand gesture.

DETAILED DESCRIPTION

Figure 1A:
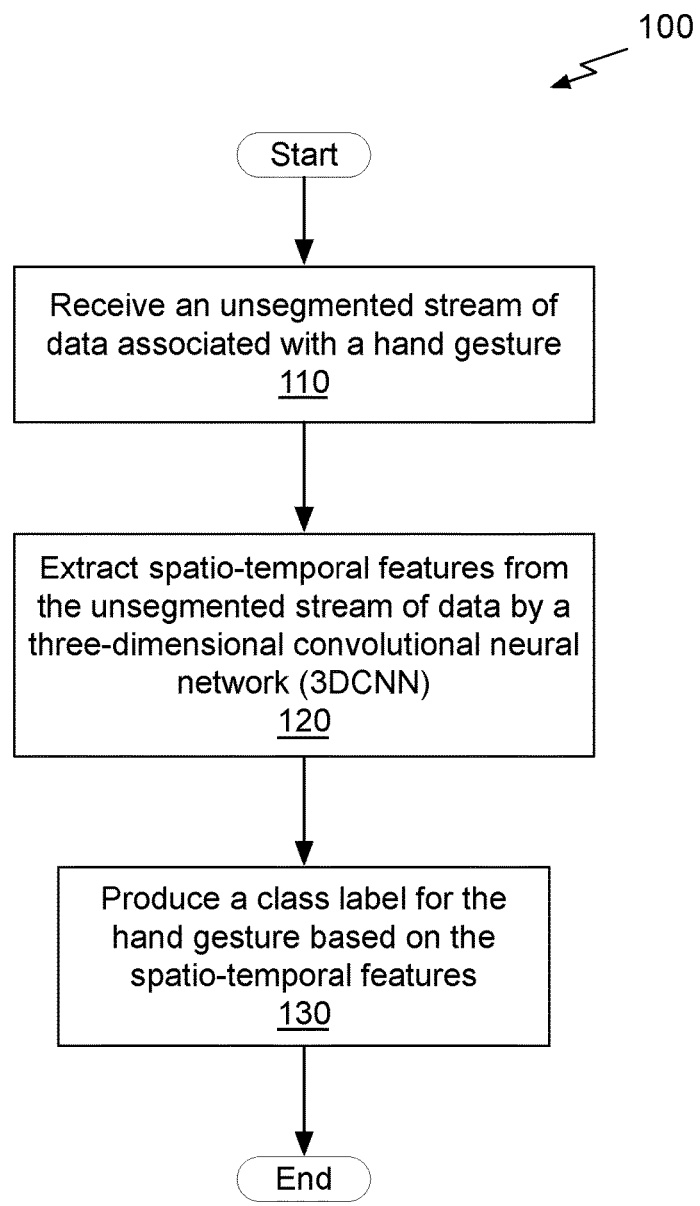
FIG. 1A illustrates a flowchart of a method for detecting and classifying dynamic hand gestures, in accordance with one embodiment.

A gesture detection and classification algorithm unifies detection and classification of dynamic hand gestures from multiple complementary modalities. The gesture detection and classification algorithm may also be used to detect and classify static hand gestures. The modalities may include data streams such as continuous depth, color, optical flow, stereo-IR, and IR disparity images. A recurrent three-dimensional convolutional neural network (R3DCNN) performs the unified detection and classification without relying on preliminary segmentation. At least one unsegmented data stream of one modality is received for processing by the R3DCNN, and the R3DCNN outputs a class label for the gesture.

The unified detection and classification technique improves early detection of gestures, resulting in zero or negative lag, which is crucial for designing responsive user interfaces. For example, the gesture is typically classified before the end of the gesture has occurred, providing an interactive user experience.

During training, a connectionist temporal classification (CTC) cost function may be employed to train the network to predict class labels from in-progress gestures in unsegmented input streams. The CTC function enables gesture classification to be based on the nucleus phase of the gesture, without requiring explicit pre-segmentation of the gesture streams into the three temporal phases (e.g., preparation, nucleus, and retraction). Feature dropout may also be employed during training to reduce overfitting and improve gesture classification accuracy.

FIG. 1 illustrates a flowchart of a method 100 for detecting and classifying dynamic hand gestures, in accordance with one embodiment. Although method 100 is described in the context of a processing element within a R3DCNN, the method 100 may also be performed by a program, custom circuitry, or by a combination of custom circuitry and a program. For example, the method 100 may be executed by a GPU, CPU, or any processor capable of performing the necessary arithmetic operations. Furthermore, persons of ordinary skill in the art will understand that any system that performs method 100 is within the scope and spirit of embodiments of the present invention.

At step 110, an unsegmented stream of data associated with a hand gesture is received. In contrast with an unsegmented stream of data, in a segmented stream of data at least one point in the stream where a gesture is detected (e.g., preparation, nucleus, and retraction) is indicated in the segmented stream of data. The stream of data is processed in some manner to provide the indication. For example, a detection classifier may process the stream of data to produce a segmented stream of data.

In addition to receiving a stream of data that is not segmented, the technique for detecting and classifying dynamic hand gestures also does not rely on environmental data to predict motions. The hand gestures that are detected and labeled may be static or dynamic gestures. Example hand gestures include moving either the hand or two fingers up, down, left or right; clicking with the index finger; beckoning; opening or shaking the hand; showing the index finger, or two or three fingers; pushing the hand up, down, out or in; rotating two fingers clockwise or counter-clockwise; pushing two fingers forward; closing the hand twice; and showing "thumb up" or "OK". In one embodiment, the hand gesture also includes at least a portion of the person's body in addition to their hand.

At step 120, spatio-temporal features are extracted from the unsegmented stream of data by a three-dimensional convolutional neural network (3DCNN). In one embodiment, one or more additional streams of data associated with the hand gesture are also received at step 110. Each unsegmented stream of data includes data of one modality such as continuous depth, color, optical flow, stereo-IR, and IR disparity images. In one embodiment, the SoftKinetic DS325 sensor (e.g., depth camera) is used to acquire front-view (facing a user providing the gesture) color and depth videos and a top-mounted DUO 3D sensor is used to record a pair of IR streams (e.g., stereo IR) viewing a user from above. A dense optical flow data stream may be computed from the color stream and an IR disparity data stream may be computed from the pair of IR-stereo streams.

At step 130, a class label for the hand gesture is produced based on the spatio-temporal features. In one embodiment, a class label is a class-conditional probability vector associated with one hand gesture. When two or more data streams are received at step 110, the class label may be generated by combining probability vectors corresponding to each one of the data streams.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
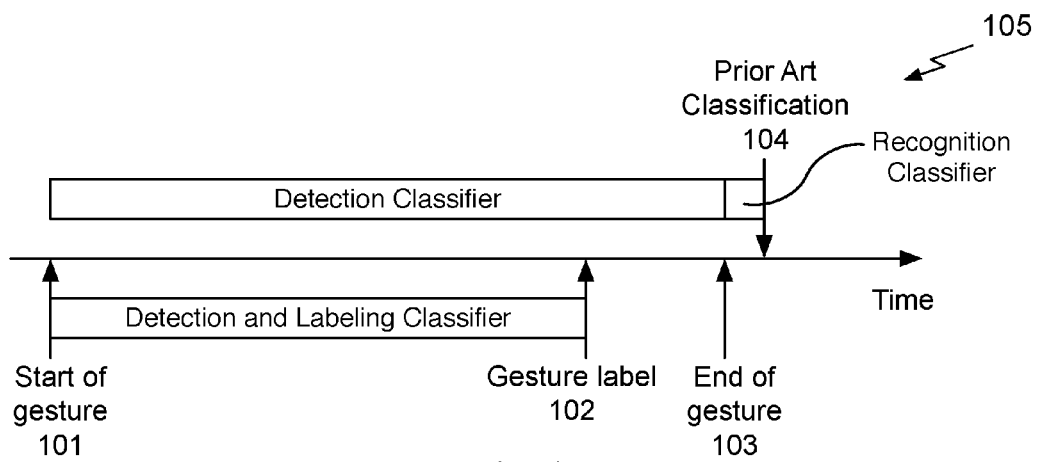
FIG. 1B illustrates a negative lag for detecting and classifying dynamic hand gestures, in accordance with one embodiment.

FIG. 1B illustrates a negative lag for detecting and classifying a dynamic hand gesture, in accordance with one embodiment. A gesture starts at a first time indicated by start of gesture 101. The gesture ends at a second time indicated by end of gesture 103. In the prior art a detection classifier algorithm begins processing the gesture, and after the detection classifier algorithm completes the detection processing (i.e., completes segmentation), a recognition classifier algorithm is used to process the segmented gesture. The recognition classifier does not start processing until the end of gesture 103 or later. The recognition classifier completes processing after the end of gesture 103 at a time indicated by a prior art classification 104.

In contrast, when the gesture detection and classification method 100 shown in FIG. 1A is used, the gesture is processed using the detection and labeling classifier algorithm. Before the end of gesture 103, the gesture is labeled at a gesture label 102. Typically, a gesture that is received by the gesture detection and classification method 100 is labeled when the gesture is 40% complete. In other words, the gesture detection and classification method 100 typically labels a gesture when only 40% of the time between the start of gesture 101 and the end of gesture 103 has elapsed. Therefore, the gesture detection and classification method 100 has a negative lag because the gesture is labeled before the end of the gesture is detected.

Connectionist temporal classification (CTC) cost function may be employed to train a neural network to implement the gesture detection and classification method 100 and predict class labels from in-progress gestures in unsegmented or weakly segmented input streams. CTC enables gesture classification to be based on the nucleus phase of the gesture, without requiring explicit pre-segmentation of the gestures into their three temporal phases. Classification during the nucleus phase results in a zero or negative lag, which is beneficial for designing responsive user interfaces.

Figure 1C:
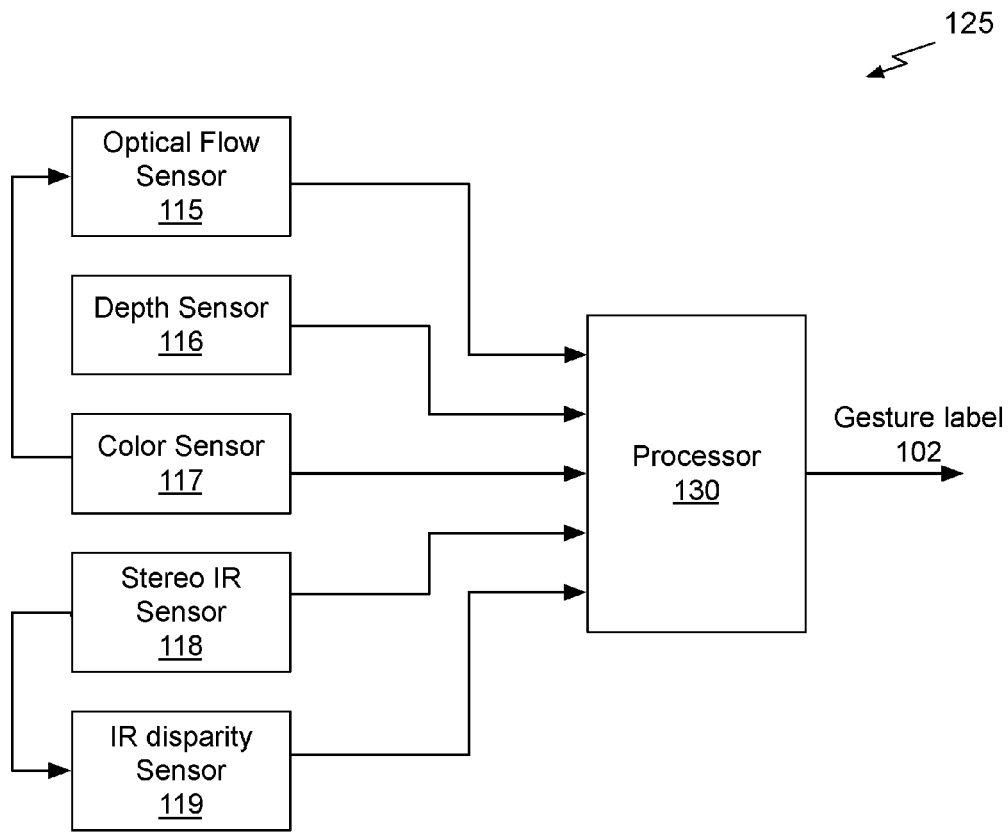
FIG. 1C illustrates a block diagram of a system for detecting and classifying dynamic hand gestures, in accordance with one embodiment.

FIG. 1C illustrates a block diagram of a system 125 for detecting and classifying dynamic hand gestures, in accordance with one embodiment. The system 125 includes a processor 130 and multiple sensors that may each provide one or more data streams to the processor 130. Each one of the sensors may provide a data stream of a different modality that is captured or computed within a gesture environment.

The gesture environment includes a human that generates static or dynamic gestures using his or her hands, arms, torso, and/or head. The processor 130 may be a graphics processor or any processor capable of performing the necessary arithmetic operations of the method 100.

A color sensor 117 may provide one or more frames of color data (RGB, YUV, etc.) captured from a front view of the gesture. In one embodiment, the color sensor 117 is a camera. An optical flow sensor 115 may provide one or more frames of optical flow data computed as flow vectors based on two or more frames of color data. A depth sensor 116 may provide one or more frames of depth data indicating front view distances to the gesture. A stereo IR sensor 118 may provide one or more frames of stereo IR data, where the stereo IR data is encoded as pairs of images for each frame producing a pair of data streams. The stereo IR data is captured from a top view of the gesture environment. An IR disparity sensor 119 may provide one or more frames of IR disparity data computed from the pair of IR-stereo data streams.

The frames of data may be encoded as a multi-dimensional tensor in dimensions of x and y (e.g., frame size in pixels), channels (e.g., RGB), and temporal length (e.g., frame number). The processor 130 may be configured to perform 3D convolution in the spatial and temporal domains, activation functions, and maximum pooling operations repeatedly before processing the data using fully connected layers of a neural network to produce local spatio-temporal features. A multi-dimensional kernel is applied as a filter during the 3D convolution.

The local spatio-temporal features represent micro-level and/or short-term details of the gesture. In other words, the local spatio-temporal features are features within a clip including one or more frames or a short buffer of frames. The processor 130 then processes the local spatio-temporal features using a recurrent layer to produce global spatio-temporal features. The global spatio-temporal features represent macro-level and/or long-term details of the gesture. In other words, the global spatio-temporal features are features extracted over multiple clips. Finally, the processor 130 processes the global spatio-temporal features using a softmax layer to predict class-conditional gesture probabilities (e.g., gesture labels). When data streams for more than one modality are input to the processor 130, the data stream for each modality may be processed separately and the resulting modality-specific probabilities may be combined using averaging to produce the gesture label 102.

In one embodiment, the processor 130 receives input data streams sequentially as m-frame clips and outputs class-conditional probabilities after processing each clip (m is a positive integer). Generally the nucleus of the gesture spans multiple clips, potentially enabling gesture classification before processing all clips resulting in a negative lag. In one embodiment, m=8.

Recurrent 3D Convolutional Neural Network (R3DCNN) Architecture

Figure 2A:
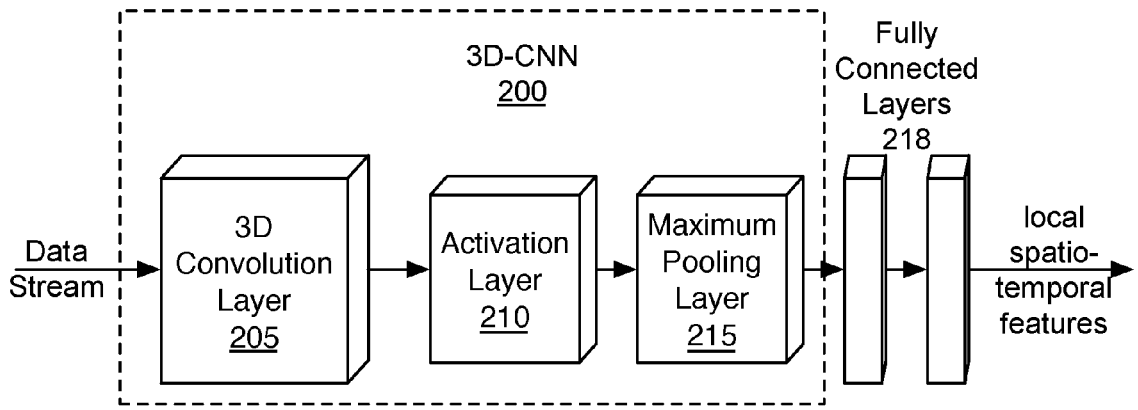
FIG. 2A illustrates a block diagram of a 3DCNN for detecting and classifying dynamic hand gestures, in accordance with one embodiment.

FIG. 2A illustrates a block diagram of a 3D-CNN 200 for detecting and classifying dynamic hand gestures, in accordance with one embodiment. A gesture data stream (e.g., video) is presented in the form of short clips $C_t$ of at least one frame to the 3D-CNN 200 for extracting local spatial-temporal features, $f_t$.

A data stream clip (e.g., video clip) is defined as a volume $C_t \in \mathbb{R}^{k \times l \times c \times m}$ of $m \geq 1$ sequential frames with c channels of size k×l pixels ending at time t. Each data stream clip is transformed into a feature representation $f_t$ by the 3D-CNN 200 implementing a function $\mathcal{F}$:

$$\mathcal{F}: \mathbb{R}^{k \times l \times c \times m} \to \mathbb{R}^q, \text{ where } f_t = \mathcal{F}(C_t), \qquad \text{Equation (1)}$$

by applying spatio-temporal filters to the data stream clip.

The 3D-CNN 200 includes a 3D convolution layer 205, an activation layer 210, a maximum pooling layer 215, and one or more fully connected neural network layers 218. In one embodiment, the 3D-CNN 200 includes multiple 3D convolution layers 205, where each 3D convolution layer 205 is followed by an activation layer 210, and a maximum pooling layer 215 connected in series before the fully connected neural network layers 218. The 3D convolution layer 205 performs 3D convolution in the spatial and temporal domains using a multi-dimensional kernel that is determined when the R3DCNN 230 is trained. The activation layer 210 applies non-linear mapping of input data into another space, and may comprise a Rectified Linear Unit (ReLU) that maps negative inputs to zero, and positive inputs to their original value. The maximum pooling layer 205 applies a downsampling operator to reduce spatial and temporal dimensions of internal multi-dimensional tensor. In one embodiment, the maximum pooling layer 205 implements a maximum operator that for every non-overlapping grid of 2×2×2 elements produces only a single value of the sub-tensor equal to the maximum value; grids might be 2×2×1, 1×2×2, 2×1×2, 1×1×2, 2×1×1, 1×2×1, where first two dimensions describe size in spatial domain, and the third one in temporal domain.

Figure 2B:
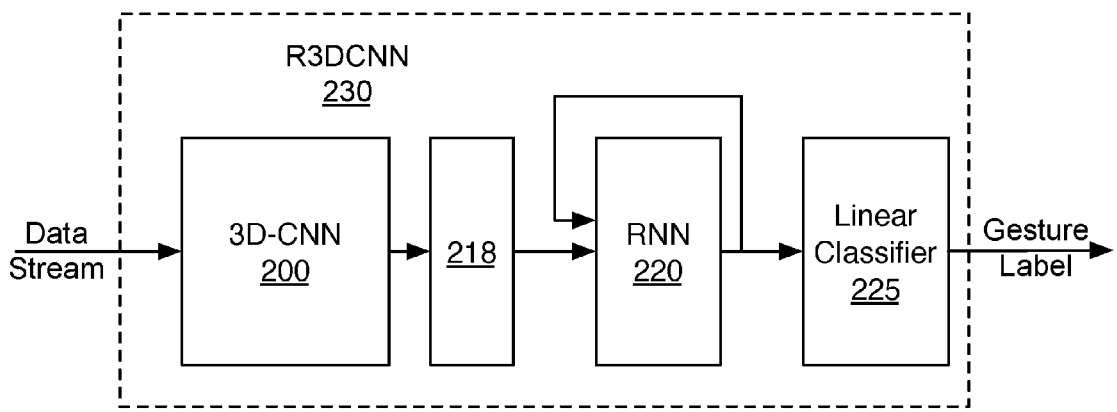
FIG. 2B illustrates a block diagram of an R3DCNN for detecting and classifying dynamic hand gestures, in accordance with one embodiment.

FIG. 2B illustrates a block diagram of an R3DCNN 230 for detecting and classifying dynamic hand gestures, in accordance with one embodiment. The 3D-CNN 200 is connected in series with a RNN 220 (i.e., recurrent layer) and a linear classifier 225.

The RNN 220 performs global temporal modeling, aggregating transitions across two or more clips of the data stream. The recurrent network maintains a hidden state vector $h_{t-1}$, which is computed using previous data stream clips and previous local spatio-temporal features. An updated hidden state vector for the current data stream clip, $h_t$, is computed using the local spatial-temporal features $f_t$ received from the 3D-CNN 200 and the hidden state vector $h_{t-1}$. The updated hidden state vector for the current data stream clip, $h_t$, is input into the linear classifier 225 to estimate class-conditional gesture probabilities, $s_t$ of the various gestures in the data stream. In one embodiment, the linear classifier 225 implements a softmax function. In one embodiment, the linear classifier 225 is replaced by a support vector machine (SVM) classifier that computes class-conditional probabilities by operating on local spatial-temporal features $f_t$ or hidden state vectors $h_t$ extracted by the R3DCNN 230.

Classification of gestures may be performed by splitting an entire data stream $\mathcal{V}$ into T clips of length m and computing the set of class-conditional probabilities $S=\{s_0, s_1, \ldots s_{T-1}\}$ for each individual data stream clip. For offline (i.e., non-real time) gesture classification, the probabilities of all the data stream clips within the entire data stream and belonging to a gesture may be combined. For example, the probabilities may be averaged to produce $s^{avg} = 1/T \Sigma_{s \in S} s$, and the predicted class is $\hat{y} = \text{argmax}_i ([s_{avg}]_i)$, across all gesture classes i. In one embodiment, per-clip probabilities $s_t$ are used to compute per-clip gesture labels and the per-clip gesture labels may be combined to produce a gesture label for multiple clips of a data stream.

Figure 2C:
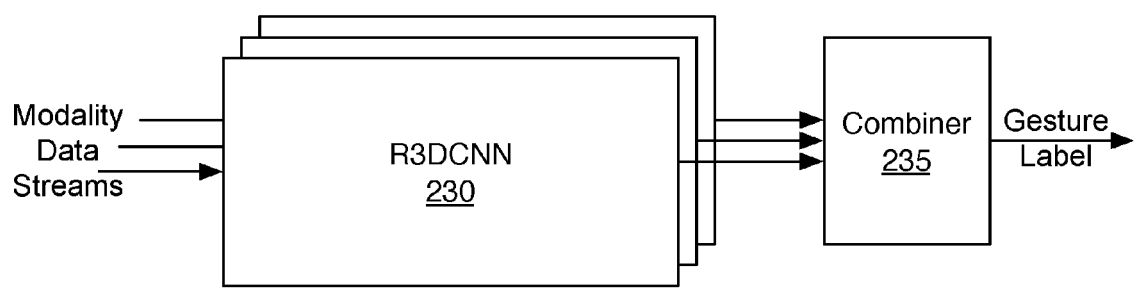
FIG. 2C illustrates a block diagram of multiple R3DCNNs for detecting and classifying dynamic hand gestures using multiple modalities, in accordance with one embodiment.

FIG. 2C illustrates a block diagram of multiple R3DCNNs 230 for detecting and classifying dynamic hand gestures using multiple modalities, in accordance with one embodiment. In one embodiment, R3DCNNs 230 are separately trained for each modality and, when fusing modalities, the class-conditional probability vectors may be averaged geometrically or algebraically. Each R3DCNN 230 receives a data stream associated with a separate modality and a combiner 235 combines the class-conditional probability vectors to produce a gesture label. In one embodiment, class-conditional probability vectors are averaged across modalities for each data stream clip to produce the gesture label. In one embodiment, local spatial-temporal features $f_t$ or hidden state vectors $h_t$ may be averaged across data stream clips and normalized by the respective 12-norms to form a single representation for the entire data stream.

TABLE 1 contains the accuracy for various combinations of sensor modalities. Observe that fusing any pair of sensors improves individual results. In addition, combining different modalities of the same sensor (e.g., color and optical flow) also improves the accuracy. The highest gesture recognition accuracy (83.8%) is observed for the combination of all modalities.

TABLE 1

Comparison of modalities and combinations

| Sensor | Accuracy | Combination | | | | | | | | |
|---|---|---|---|---|---|---|---|---|---|---|
| Depth | 80.3% | | | X | X | | X | X | X | X | X |
| Optical flow | 77.8% | | X | X | | X | X | X | X | X | X |
| Color | 74.1% | | X | | X | X | | | | X | X |
| IR image | 63.5% | X | | | X | X | | X | X | X | X |
| IR disparity | 57.8% | X | | | | | | | X | | X |
| Fusion Accuracy % | | 66.2 | 79.3 | 81.5 | 82.0 | 82.0 | 82.4 | 82.6 | 83.2 | 83.4 | 83.8 |

Figure 2D:
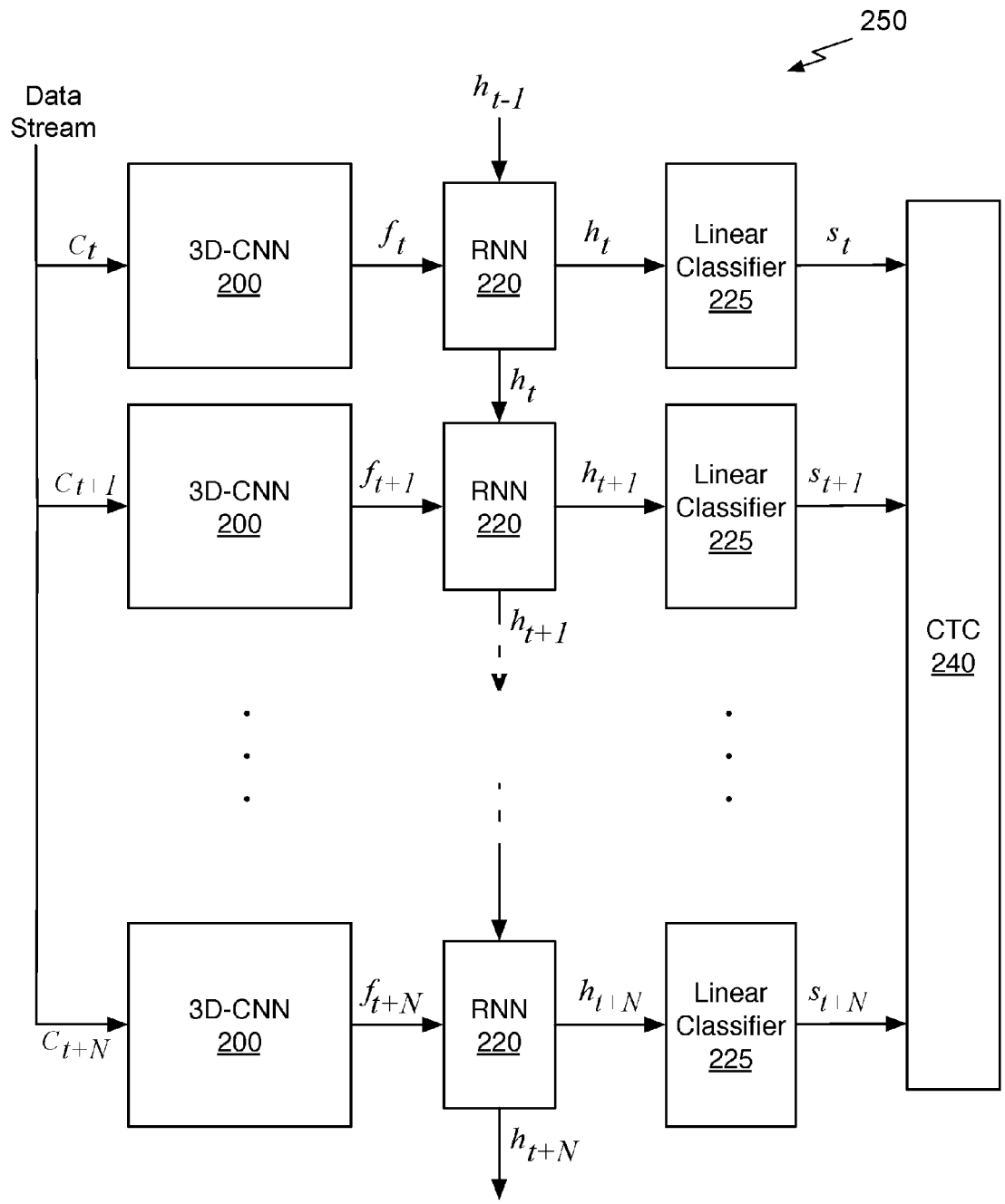
FIG. 2D illustrates a conceptual block diagram of an R3DCNN for detecting and classifying dynamic hand gestures, in accordance with one embodiment.

FIG. 2D illustrates a conceptual block diagram of an R3DCNN 250 for detecting and classifying dynamic hand gestures, in accordance with one embodiment. In addition to the 3D-CNN 200, RNN 220, and linear classifier 225, the R3DCNN 250 includes a connectionist temporal classification unit (CTC) 240. During training, the CTC 240 is used to implement a cost function and during inference, the CTC 240 is not used. As understood by those skilled in the art, CTC is a cost function designed for training a CNN on a sequence that is unsegmented or weakly segmented. The CTC 240 implements a CTC forward algorithm that identifies and correctly labels the nucleus of the gesture, while assigning a no gesture class to the remaining clips, addressing the alignment of class labels to particular clips in the data stream. When the R3DCNN 250 is used for inferencing, the CTC 240 may be replaced with the combiner 235.

The R3DCNN 250 receives a data stream partitioned into a sequence of clips ($C_t, C_{t+1}, \ldots, C_{t+N}$) and each 3D-CNN 200 processes one clip in the sequence of clips to produce the local spatial-temporal features ($f_t, f_{t+1}, \ldots f_{t+N}$). Each RNN 220 computes the hidden state vector $h_t \in \mathbb{R}^d$ as a function of the hidden state of the previous clip $h_{t-1}$ and the feature representation of the current clip $f_t$:

$$h_t = \mathcal{R}(W_{in}f_t + W_h h_{t-1}), \quad \text{Equation (2)}$$

with weight matrices $W_{in} \in \mathbb{R}^{d \times q}$ and $W_h \in \mathbb{R}^{d \times d}$. During training, a truncated rectified linear unit $\mathcal{R}: \mathbb{R}^d \to \mathbb{R}^d$, $\mathcal{R}(x) = \min(\max(0, x), 4)$ may be used by the RNN 220 to limit gradient explosion. Finally, the linear classifier 225 transforms the hidden state vector $h_t$ into class-conditional probabilities $s_t$ of w classes:

$$s_t = S(W_s h_t + b)$$

with weights $W_s \in \mathbb{R}^{w \times d}$, bias $b \in \mathbb{R}^w$, and a softmax function $S: \mathbb{R}^w \to \mathbb{R}^w_{[0,1]}$, where $[S(x)]_i = e^{x_i}/\Sigma_k e^{x_k}$. The label for the gesture class w having the highest probability is output as the gesture label.

Figure 2E:
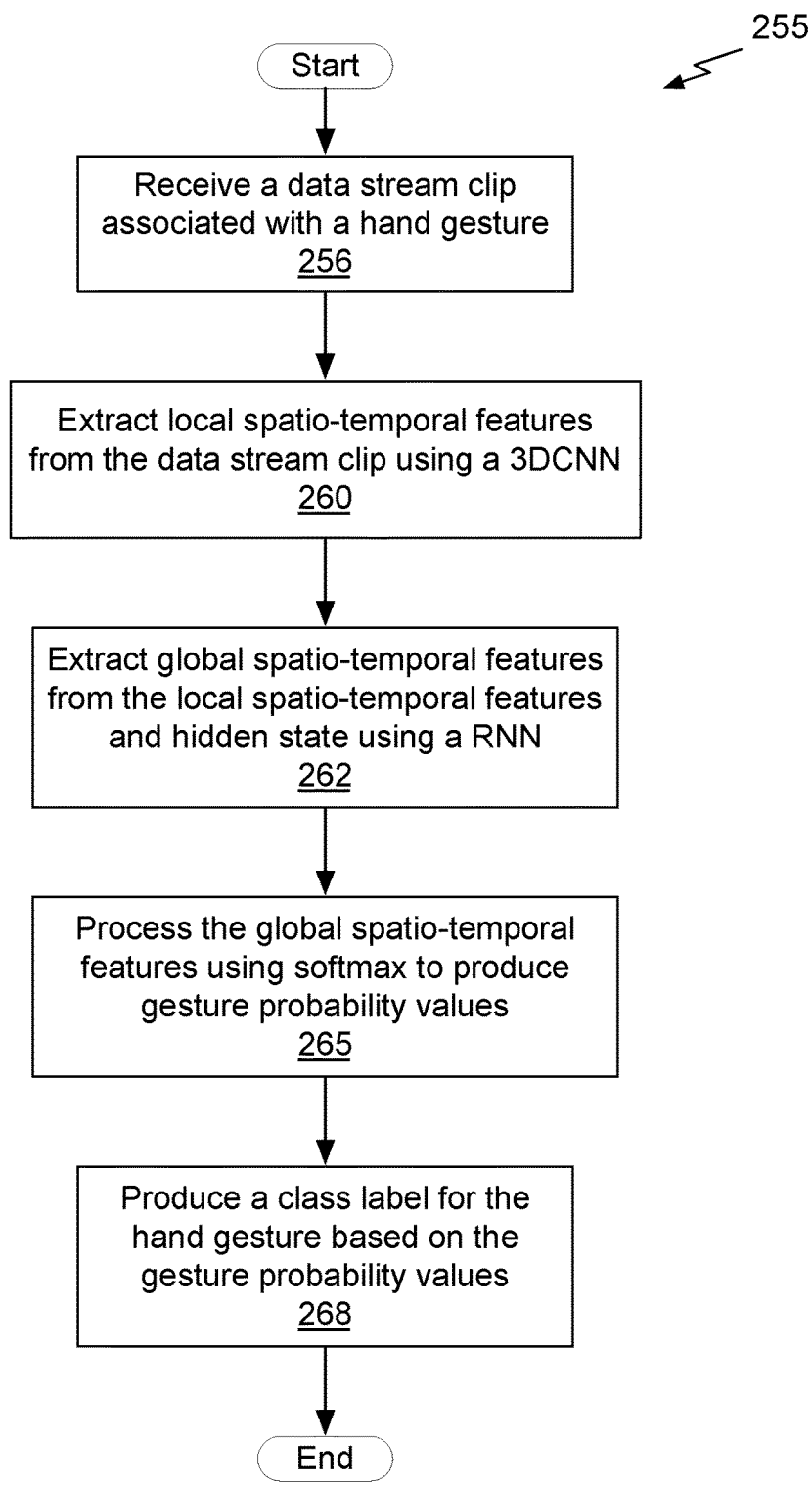
FIG. 2E illustrates another flowchart of a method for detecting and classifying dynamic hand gestures, in accordance with one embodiment.

FIG. 2E illustrates another flowchart of a method 255 for detecting and classifying dynamic hand gestures during inferencing, in accordance with one embodiment. At step 256, a data stream clip for a modality is received by the R3DCNN 230 or 250. At step 260, the 3DCNN 200 extracts local spatio-temporal features from the data stream clip. At step 262, the RNN 220 extracts global spatio-temporal features from the local spatio-temporal features and the hidden state of the previous clip (i.e., the global spatio-temporal features from the previous clip). At step 265, a softmax layer processes the global spatio-temporal features to generate class-conditional probability vector. A class-conditional probability value is generated for each possible gesture class and the no gesture class to generate a class-conditional probability vector. The class-conditional probability values generated for each modality sum to one (e.g., 100%).

At step 268, a class label is produced for the hand gesture based on the gesture probability values. In one embodiment, the combiner 235 combines the class-conditional probability vectors for two or more modalities to produce the gesture label. In one embodiment, the class label is produced for a class-conditional probability vector corresponding to one modality and one data stream clip. In one embodiment, the class label is produced for class-conditional probability vectors corresponding to one modality and multiple data stream clips. In one embodiment, the class label is produced for class-conditional probability vectors corresponding to multiple modalities and one data stream clip. In one embodiment, the class label is produced for class-conditional probability vectors corresponding to multiple modalities and multiple data stream clips.

Training

Figure 2F:
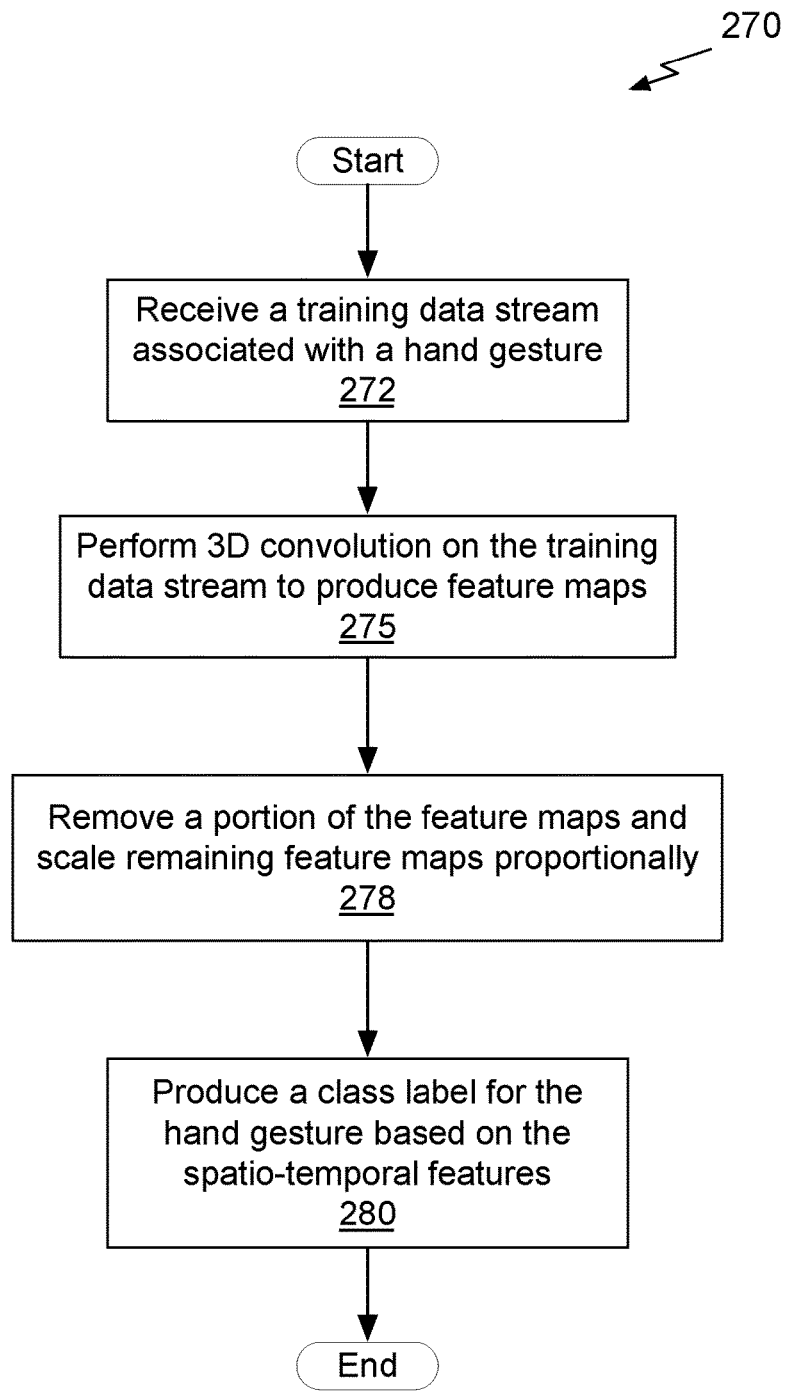
FIG. 2F illustrates a flowchart of a method for training the 3DCNN for gesture detection and labeling, in accordance with one embodiment.

FIG. 2F illustrates a flowchart of a method for training the R3DCNN 230 or 250 for gesture detection and labeling, in accordance with one embodiment. At step 272, a training data stream associated with a hand gesture is received by the R3DCNN 230 or 250. In one embodiment, $\mathcal{X} = \{\mathcal{V}_0, \mathcal{V}_1, \ldots, \mathcal{V}_{P-1}\}$ is a mini-batch of training examples in the form of weakly-segmented gesture videos $\mathcal{V}_i$. Note that weakly-segmented videos contain the preparation, nucleus, and retraction phases and frames from the no gesture class. Each video consists of T clips, making $\mathcal{X}$ a set of N=T·P clips. Class labels $y_i$ are drawn from the alphabet $\mathcal{A}$ to form a vector of class labels y with size |y|=P.

In one embodiment, the 3D-CNN 200 is initialized with the C3D network trained on the large-scale Sport-1M human recognition dataset. The network has 8 convolutional layers of 3×3×3 filters and 2 fully-connected neural network layers trained on 16-frame clips. In one embodiment, a softmax prediction layer is appended to the last fully-connected neural network layer and the 3D-CNN 200 is fine-tuned by back-propagation with negative log-likelihood to predict gestures classes from individual clips $C_i$.

At step 275, the 3D convolution layer 205 performs 3D convolution on the training data stream to produce feature maps. Each feature map corresponds to a different semantic feature extracted from the input stream. Feature maps are recomputed for different modalities and different input clips. At step 278, a portion of the feature maps are removed and remaining feature maps are scaled proportionally. In one embodiment, the feature maps are randomly selected for drop-out and each selected feature map is set to zero to remove the feature map. Employing feature map drop-out when training the 3D-CNN 200 from scratch provided little or no improvement in hand gesture recognition. However, when the 3D-CNN 200 is pre-trained on a larger dataset with more classes and then fine-tuned for a smaller domain with fewer training examples and classes, not all of the original feature maps are likely to exhibit strong activations for the new training data streams, resulting in overfitting during the fine-tuning. Dropping feature maps in the convolution layers 205 improves generalization in pre-trained networks. The accuracies of the 3D-CNN 200 are improved for all modalities when the 3D-CNN 200 is trained using feature map drop-out. In one embodiment, a drop-out rate of 10% is used to remove a portion of the feature maps for one or more data streams and activations of each remaining feature map are scaled by 1.1 during a training procedure; at inference time, all feature maps have no additional scaling.

At step 280, a class label is produced for the hand gesture based on the spatio-temporal features. At first, feature maps from the last 3D convolutional layer of the 3D-CNN 200 are vectorized and passed through fully connected layers 218 followed by the recurrent layer 220. The output of the recurrent layer 220 is fed into the linear classifier 225 to produce output class conditional probabilities. The CTC 240 computes the probability of the sequence and, given a ground truth sequence, propagates errors to the preceding layer. Given the error in estimate, each layer updates its parameters in the direction of error reduction and propagates any remaining error to reduce errors. In one embodiment, the training procedure is implemented as stochastic gradient descent with momentum. The training procedure may be repeated iteratively until convergence is achieved.

After fine-tuning the 3D-CNN 200, the entire R3DCNN 230 or 250 is trained with back-propagation-through-time (BPTT). BPTT is equivalent to unrolling the recurrent layers, transforming the recurrent layers into a multi-layer feed-forward network, applying standard gradient-based back-propagation, and averaging the gradients to consolidate updates to weights duplicated by unrolling.

Two training cost functions may be considered: negative log-likelihood for the entire training data stream and CTC for training data stream clips. The negative log-likelihood function for a mini-batch of training data streams is:

$$\mathcal{L} = \frac{1}{P}\sum_{i=0}^{P-1} \log(p(y_i|V_i)),$$

where $p(y_i|\mathcal{V}_i)=[s^{avg}]_{y_i}$ is the probability of gesture label $y_i$ given training data stream (e.g., video) $\mathcal{V}_i$ as predicted by the R3DCNN 230 or 250.

The dictionary of existing gestures is extended to include a no gesture class: $\mathcal{A}'=\mathcal{A} \cup \{\text{no gesture}\}$. Consequently, the linear classifier 225 outputs a class-conditional probability for this additional no gesture class. Instead of averaging predictions across training data stream clips in a pre-segmented data stream, the R3DCNN 230 or 250 computes the probability of observing a particular gesture (or no gesture) k at time t in an unsegmented training data stream $\mathcal{X}$: $p(k, t|\mathcal{X})=s_t^k \forall t \in [0, N)$.

A path π is defined as a possible mapping of the unsegmented training data stream $\mathcal{X}$ into a sequence of class labels y. The probability of observing path π is $p(\pi|\mathcal{X})=\Pi_t s_t^{\pi_t}$, where $\pi_t$ is the class label predicted at time t in path π.

Paths are mapped into a sequence of event labels y by operator $\mathcal{B}$ as $y=\mathcal{B}(\pi)$, condensing repeated class labels and removing no gesture labels, e.g., $\mathcal{B}([-, 1, 2, -, -])= \mathcal{B}([1, 1, -, 2, -])=[1,2]$, where 1, 2 are actual gesture classes and "-" is no gesture. Under B, many paths π result in the same event sequence y. The probability of observing a particular sequence y given an input sequence $\mathcal{X}$ is the sum of the conditional probabilities of all paths π mapping to that sequence, $\mathcal{B}^{-1}(y)=\{\pi: \mathcal{B}(\pi)=y\}$:

$$p(y|\mathcal{X})=\Sigma_{\pi \in \mathcal{B}^{-1}(y)} p(\pi|\mathcal{X}).$$

Computation of $p(y|\mathcal{X})$ is simplified by dynamic programming. An assistant vector ẏ is generated by adding a no gesture label before and after each training data stream clip in y, so that ẏ contains |ẏ|=P'=2P+1 labels. Then, a forward variable $\alpha \in \mathbb{R}^{N \times P}$ is computed, where $\alpha_t(u)$ is the combined probability of all mappings of events up to training data stream clip t and event u. The transition function for α is:

$$\alpha_t(u) = s_t^{\dot{y}_u}(\alpha_{t-1}(u) + \alpha_{t-1}(u-1) + \beta_{t-1}(u-2)),$$

where $$\beta_t(u) = \begin{cases} \alpha_t(u), & \text{if } \dot{y}_{u+1} = \text{no gesture and } \dot{y}_u \neq \dot{y}_{u+2} \\ 0, & \text{otherwise} \end{cases}$$

and $\dot{y}_u$ denotes the class label of event u. The forward variable is initialized with $\alpha_0(0)=s^{\dot{y}_0}$, the probability of a path beginning with $\dot{y}_0$=no gesture, and $\alpha_0(1)=s^{\dot{y}_1}$, the probability of a path starting with the first actual event $\dot{y}_1$. Since a valid path cannot begin with a later event, $\alpha_0(i)$ is initialized: $\alpha_0(i)=0 \; \forall i>1$. At each time step t>0, paths in which the event u is currently active (with probability $s^{\dot{y}_u}$) are considered and (1) remains unchanged from the previous time t−1($\alpha_{t-1}(u)$), (2) changes from no gesture to the next actual gesture or vice versa ($\alpha_{t-1}(u-1)$), or (3) transitions from one actual gesture to the next while skipping no gesture if the two gestures have distinct labels ($\beta t-1(u-2)$). Finally, any valid path π must end at time N−1 with the last actual gesture or with no gesture $\dot{y}_{P'-1}$ or with no gesture $\dot{y}_{P'}$, hence $p(y|\mathcal{X})=\alpha_{N-1}(P'-1)+\alpha_{N-1}(P')$.

Using this computation for $p(y|\mathcal{X})$, the CTC loss is:

$$\mathcal{L}_{CTC}=-\ln(p(y|\mathcal{X})),$$

expressed in the log domain. While CTC is used as a training cost function only, it affects the architecture of the network by adding the extra no gesture class label. For pre-segmented data stream classification, the no gesture output is removed and probabilities are renormalized by the $l_1$-norm after modality fusion.

In one embodiment, to optimize the network parameters $\mathcal{W}$ with respect to either of the loss functions stochastic gradient descent (SGD) is used with a momentum term $\mu=0.9$. Each parameter of the network $\theta \in \mathcal{W}$ is updated at every back-propagation step i by:

$$\theta_i = \theta_{i-1} + v_i - \gamma\lambda\theta_{i-1},$$

$$v_i = \mu v_{i-1} - \lambda \mathcal{J}\left(\left(\frac{\delta E}{\delta \theta}\right)_{batch}\right),$$

where $\lambda$ is the learning rate, $$\left(\frac{\delta E}{\delta \theta}\right)_{batch}$$

is the gradient value of the chosen cost function E with respect to the parameter $\theta$ averaged over the mini-batch, and $\gamma$ is the weight decay parameter. To prevent gradient explosion in the recurrent layers during training, a soft gradient clipping operator $\mathcal{J}(\cdot)$ is applied with a threshold of 10.

In addition to drop-out for feature maps, a number of regularization techniques may be employed to reduce overfitting. For example, a weight decay ($\gamma=0.5\%$) may be used for all weights in the network. Drop-out may be applied to the fully-connected layers of the 3D-CNN 200. In one embodiment, a drop-out rate of p=75% is used and the remaining activations are rescaled by a factor of 1/(1−p).

In one embodiment, during training, the 3D-CNN 200 is fine-tuned for 16 epochs with an initial learning rate of $\lambda=3\times10^{-3}$, reducing by a factor of 10 after every 4 epochs. Next, the R3DCNN 230 or 250 is trained end-to-end for an additional 100 epochs with a constant learning rate of $\lambda=3\times10^{-4}$. All network parameters without pre-trained initializations are randomly sampled from a zero-mean Gaussian distribution with a standard deviation 0.01.

In one embodiment, each training data stream of a weakly-segmented gesture is stored with 80 frames of 120×160 pixels and training is completed with frames of size 112×112 generated by random crops. Videos from the test set are evaluated with the central crop of each frame. To increase variability in the training examples, additional data augmentation steps may be applied to each video in addition to cropping. For example, one or more of random spatial rotation, scaling, temporal scaling, and jittering may also be applied to the video. The parameters for each augmentation step may be drawn from a uniform distribution with a specified range. Since recurrent connections can learn the specific order of data streams in the training set, the training gesture data streams may be randomly permuted for each training epoch.

In on embodiment, the 3D-CNNs 200 may be pre-trained on three-channel RGB images. To apply the pre-trained 3D-CNN 200 to one-channel depth or IR images, the convolutional kernels for the three channels of the first layer may be summed to obtain one kernel. Similarly, to employ the pre-trained 3D-CNNs 200 with two-channel inputs (e.g. optical flow), the third channel of each kernel may be removed and the remaining two channels may be rescaled by a factor of 1.5.

In one embodiment, for the 3D-CNN 200, splitting a gesture into non-overlapping clips of m=8 frames yields the best combination of classification accuracy, computational complexity and prediction latency. To work with clips of size m=8 frames on the C3D network (originally trained with m=16 frames), temporal pooling is removed after the last convolutional layer.

In one embodiment, the R3DCNN 230 or 250 that is trained using training data streams generated by a particular sensor for a modality is used to accurately detect and classify gestures captured using a different sensor for the same modality. As a result of the training techniques, the accuracy of the R3DCNN 230 or 250 may be used to detect and classify gestures captured using a variety of sensors for a modality, even when the R3DCNN 230 or 250 is trained using a different sensor for the modality.

Parallel Processing Architecture

Figure 3:
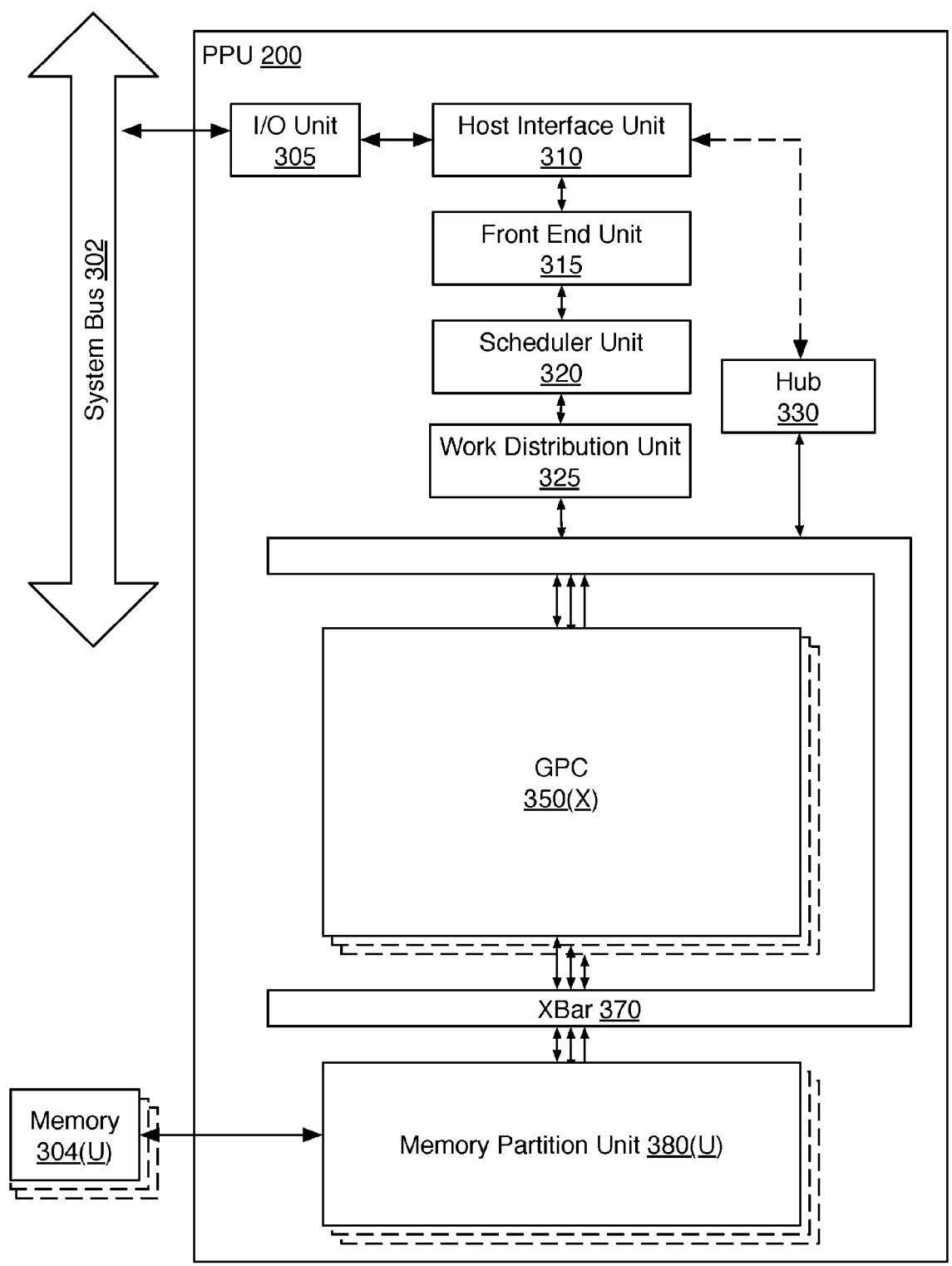
FIG. 3 illustrates a parallel processing unit, in accordance with one embodiment.

FIG. 3 illustrates a parallel processing unit (PPU) 300, in accordance with one embodiment. The PPU 300 may be configured to implement the system 125 and one or more layers of the R3DCNN 230 or 250.

In one embodiment, the PPU 300 is a multi-threaded processor that is implemented on one or more integrated circuit devices. The PPU 300 is a latency hiding architecture designed to process a large number of threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise a number of instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
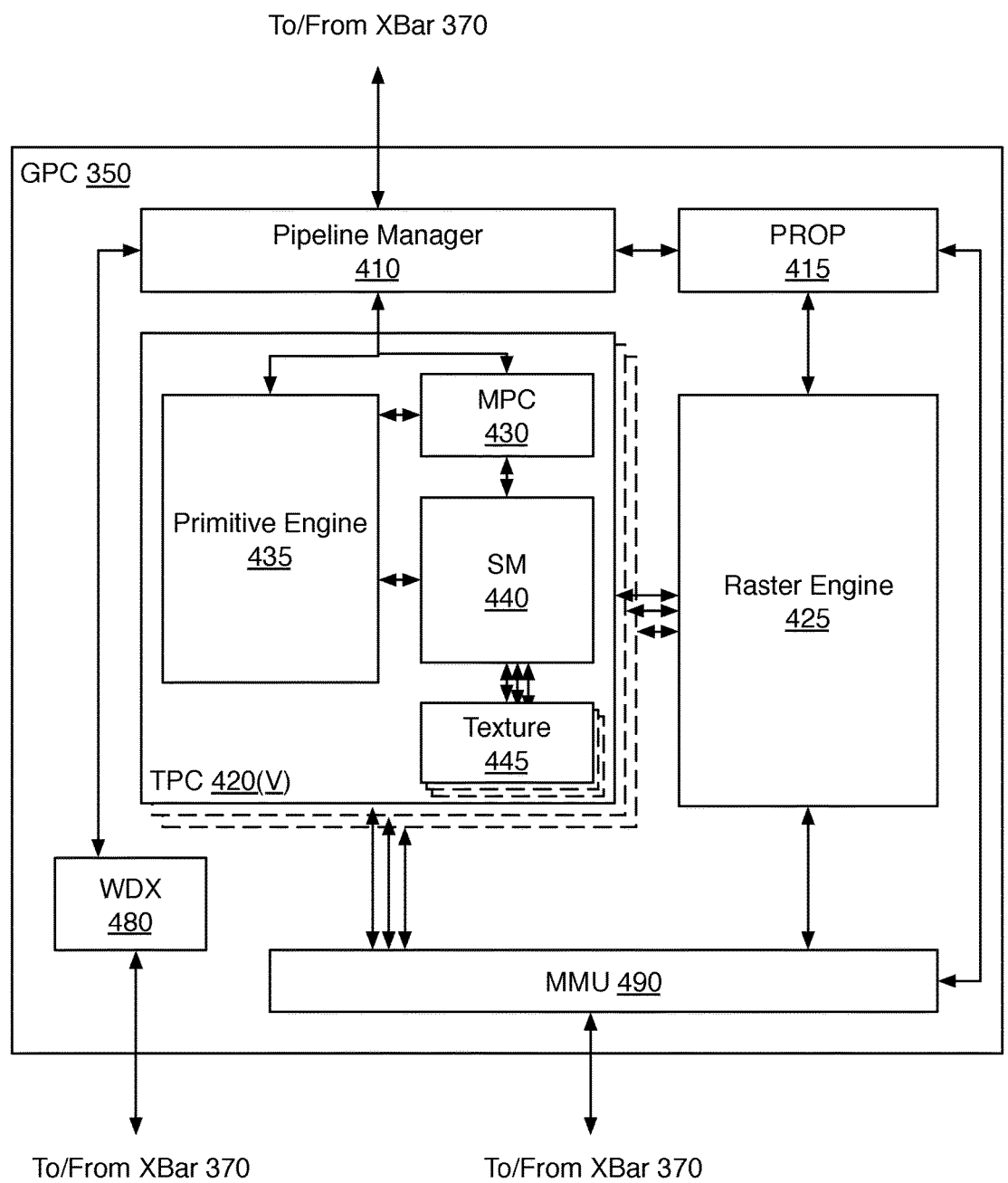
FIG. 4A illustrates a general processing cluster of the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 may be described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for improving translation of virtual addresses into physical addresses in the memory 304.

Figure 4B:
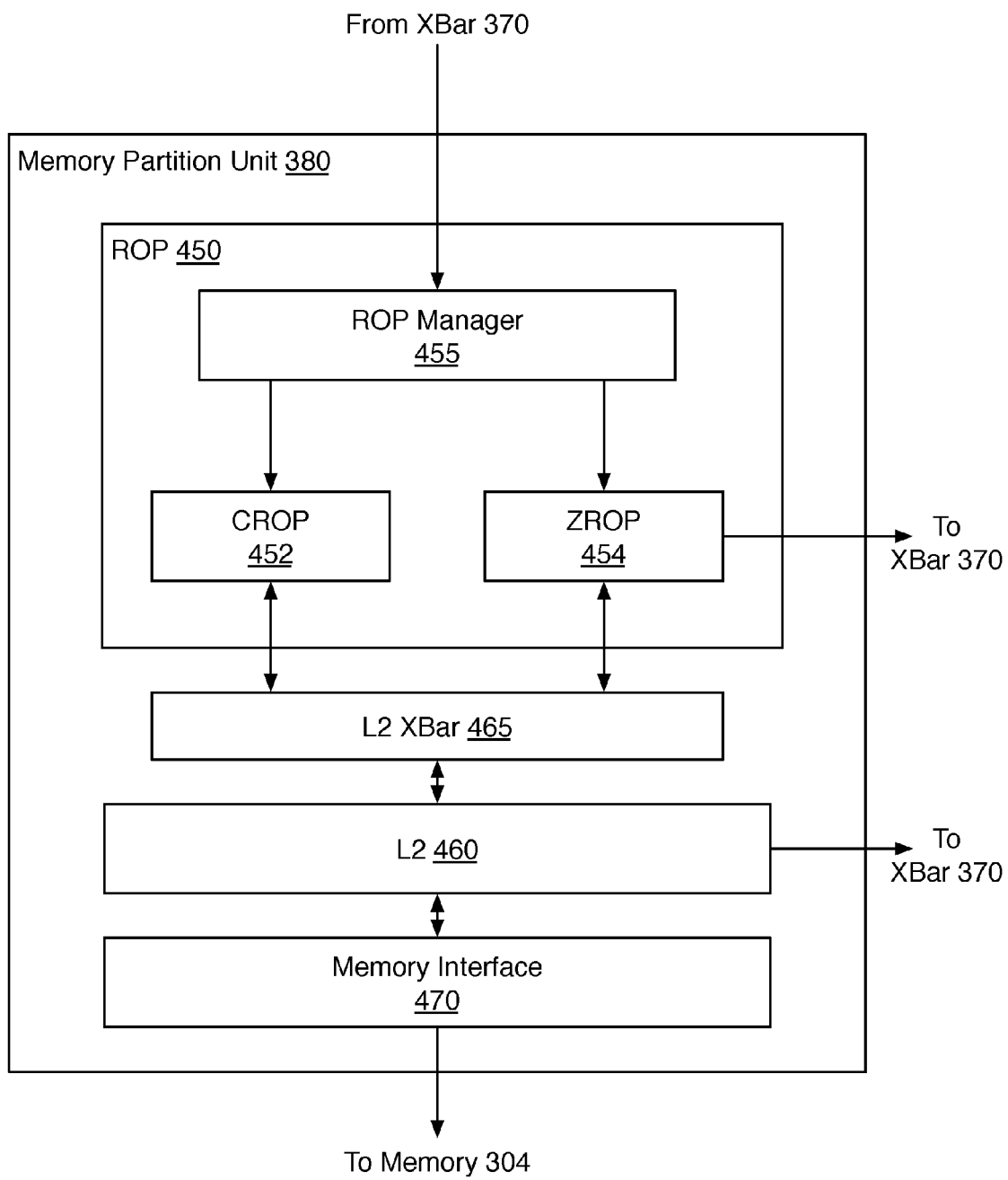
FIG. 4B illustrates a partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 comprises U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
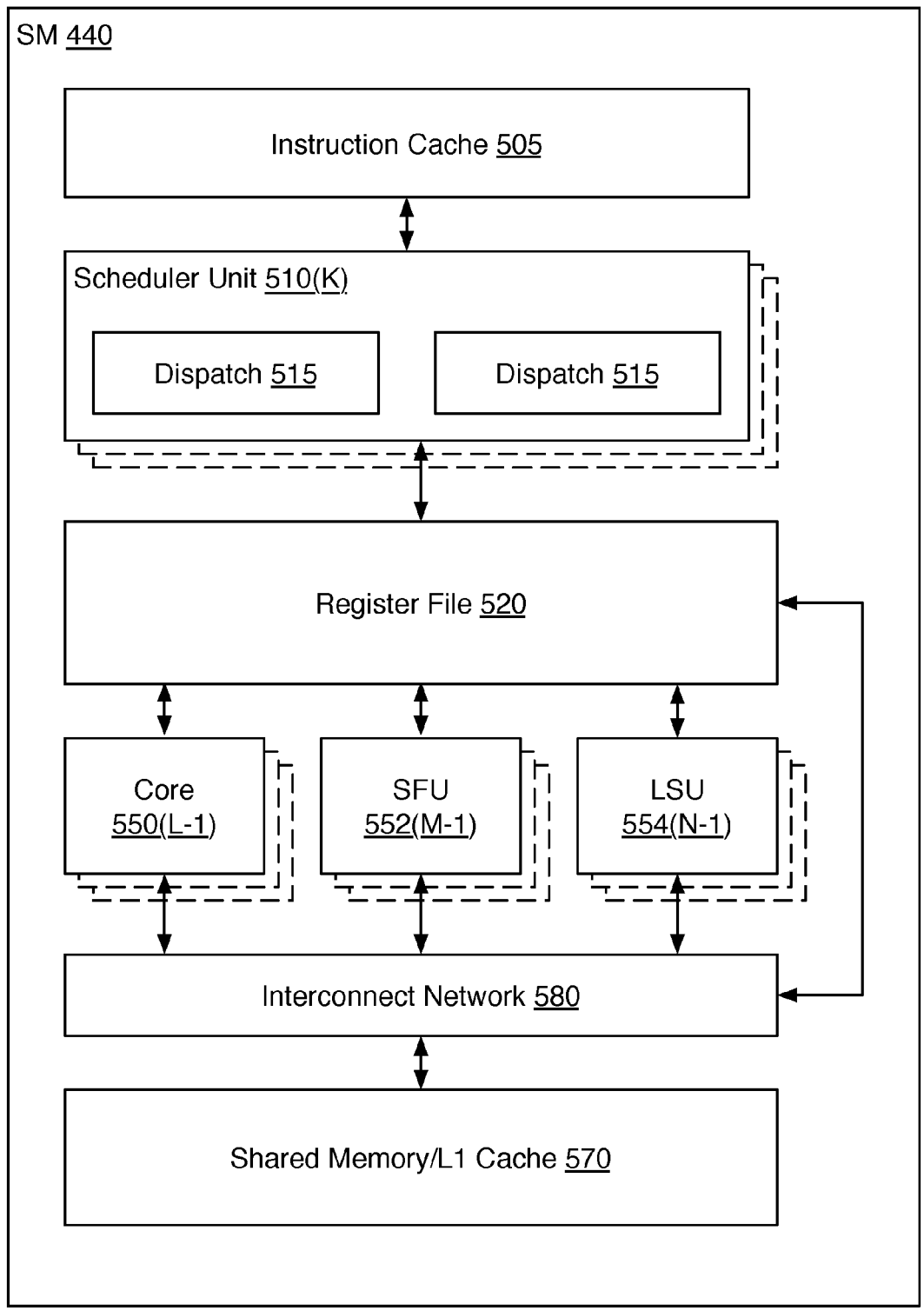
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes.

The PPU 300 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 communicate between threads, and the LSU 554 to read and write Global memory through partition shared memory/L1 cache 570 and partition unit 380.

When configured for general purpose parallel computation, the SM 440 can also write commands that scheduler unit 320 can use to launch new work on the TPCs 420.

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various layers of the R3DCNN 230 or 250. For example, the device driver may launch a kernel on the PPU 300 to implement the 3D-CNN 230 on one SM 440 (or multiple SMs 440). The device driver (or the initial kernel executed by the PPU 300) may also launch other kernels on the PPU 300 to perform other layers of the R3DCNN 230 or 250, such as the RNN 220 and the linear classifier 225. In addition, some of the layers of the R3DCNN 230 or 250 may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
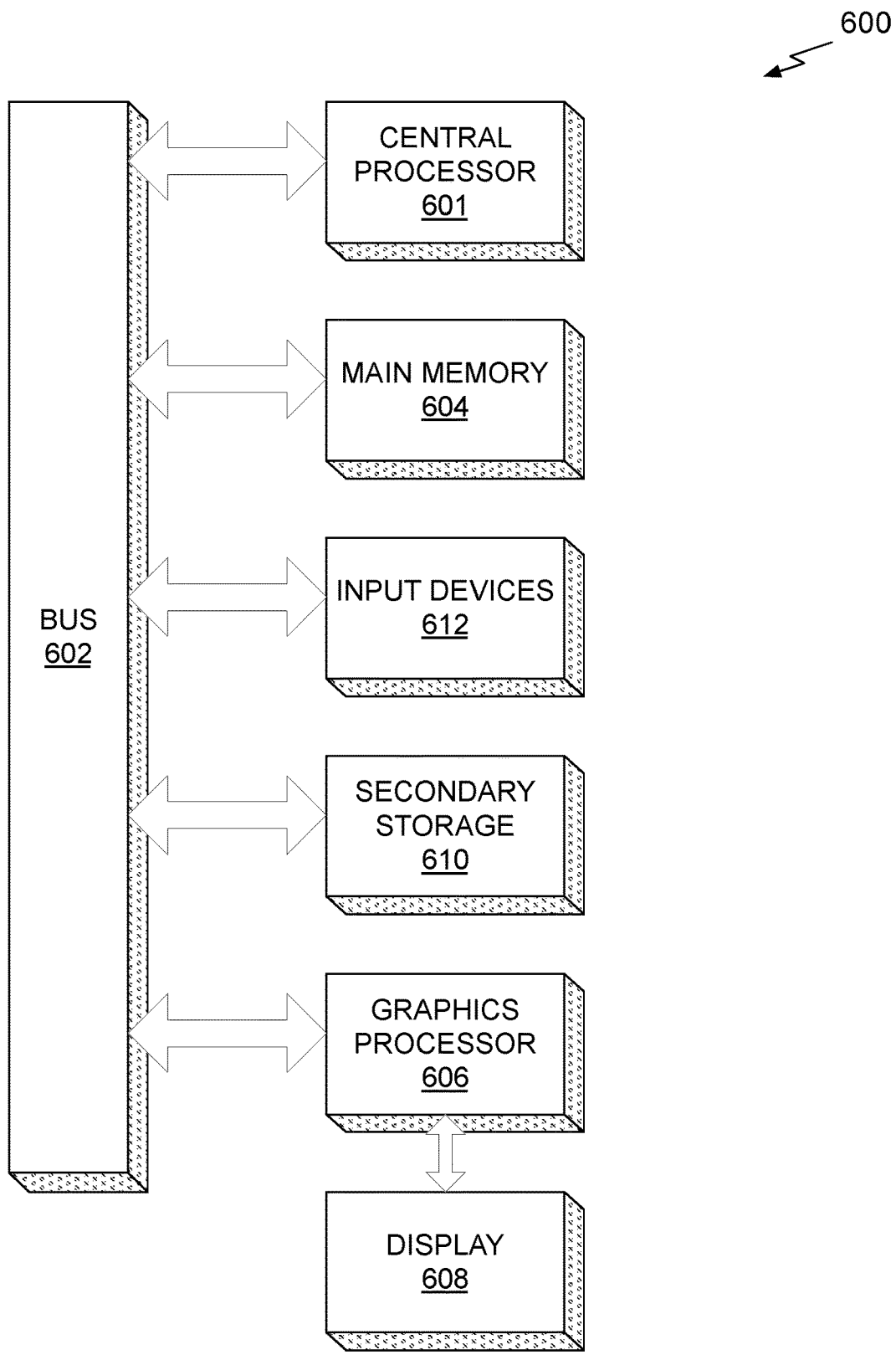
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be used to implement the R3DCNN 230 or 250 for dynamic gesture recognition. The R3DCNN 230 or 250 support online gesture classification with zero or negative lag, effective modality fusion, and may be trained with weakly segmented data streams. In one embodiment, the R3DCNN 230 or 250 achieves an accuracy of 83.8% for weakly segmented gestures that contain all three gesture phases, comparing favorably with human subject accuracy of 88.4%. By employing a recurrent connection and CTC for training the R3DCNN 230 or 250, may also perform online detection and recognition of gestures accurately during only the nucleus phase of the gesture.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. Data streams associated with gestures may be stored in the main memory 604 and/or the secondary storage 610.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for detecting and classifying gestures, comprising:
   receiving, by a processor, an unsegmented stream of data associated with a hand gesture, wherein the processor is configured as a three-dimensional convolutional neural network (3D-CNN) for unified detection and classification of gestures;
   extracting spatio-temporal features from the unsegmented stream by the 3D-CNN; and
   producing a class label for the hand gesture based on the spatio-temporal features.

2. The method of claim 1, wherein the spatio-temporal features are local spatio-temporal features extracted from a frame within the unsegmented stream of data and the processor is further configured as a recurrent neural network layer, and producing comprises processing the local spatio-temporal features by the recurrent neural network layer to generate global spatio-temporal features based on a set of frames within the unsegmented stream of data.

3. The method of claim 2, wherein the processor is further configured as a softmax layer and the global spatio-temporal features are processed by the softmax layer to generate the class label.

4. The method of claim 2, wherein the producing further comprises processing global spatio-temporal features generated by the recurrent neural network layer for a previous set of frames within the unsegmented stream of data.

5. The method of claim 1, wherein the unsegmented stream of data comprises a sequence of frames partitioned into clips of m frames, and further comprising producing a class label for each one of the clips.

6. The method of claim 5, wherein the spatio-temporal features comprise local spatio-temporal features corresponding to each frame within a first clip of the clips and global spatio-temporal features corresponding to two or more of the clips.

7. The method of claim 1, wherein the unsegmented stream of data comprises color values corresponding to the hand gesture.

8. The method of claim 1, wherein the unsegmented stream of data comprises depth values corresponding to the hand gesture.

9. The method of claim 1, wherein the unsegmented stream of data comprises optical flow values corresponding to the hand gesture.

10. The method of claim 1, wherein the unsegment stream of data comprises stereo-infrared pairs and/or disparity values corresponding to the hand gesture.

11. The method of claim 1, wherein the class label is produced before the hand gesture ends.

12. The method of claim 1, wherein the unsegmented stream of data is one of color data and depth data, and further comprising:
receiving a second unsegmented stream of stereo-infrared data;
generating a first class-conditional probability vector for the unsegmented stream of data; and
generating a second class-conditional probability vector for the second unsegmented stream.

13. The method of claim 12, wherein producing the class label comprises combining the first class-conditional probability vector with the second class-conditional probability vector.

14. The method of claim 1, wherein the 3D-CNN is trained using weakly-segmented streams of data captured using a first sensor and the unsegmented stream of data associated with the hand gesture is obtained using a second sensor that is different than the first sensor.

15. The method of claim 1, wherein a CNN function is used during training of the 3D-CNN.

16. The method of claim 1, wherein during training of the 3D-CNN, the 3D-CNN generates first spatio-temporal features and a portion of the first spatio-temporal features are removed before the first spatio-temporal features are processed by a recurrent neural network.

17. A system for detecting and classifying gestures, comprising:
a memory configured to store an unsegmented data stream associated with a hand gesture; and
a processor that is coupled to the memory and configured as a three-dimensional convolutional neural network (3D-CNN) for unified detection and classification of gestures to:
receive the unsegmented stream of data;
extract spatio-temporal features from the unsegmented stream using the 3D-CNN; and
produce a class label for the hand gesture based on the spatio-temporal features.

18. The system of claim 17, wherein the spatio-temporal features are local spatio-temporal features extracted from a frame within the unsegmented stream of data and the processor is further configured as a recurrent neural network layer, and
the recurrent neural network layer processes the local spatio-temporal features to generate global spatio-temporal features based on a set of frames within the unsegmented stream of data.

19. A non-transitory computer-readable media storing computer instructions for detecting and classifying gestures that, when executed by one or more processors, cause the one or more processors to perform the steps of:
receiving an unsegmented stream of data associated with a hand gesture, wherein the one or more processors are each configured as a three-dimensional convolutional neural network (3D-CNN) for unified detection and classification of gestures;
extracting spatio-temporal features from the unsegmented stream by the 3D-CNN; and
producing a class label for the hand gesture based on the spatio-temporal features.

20. The non-transitory computer-readable media of claim 19, wherein the spatio-temporal features are local spatio-temporal features extracted from a frame within the unsegmented stream of data and the processor is further configured as a recurrent neural network layer, and
the recurrent neural network layer processes the local spatio-temporal features to generate global spatio-temporal features based on a set of frames within the unsegmented stream of data.

* * * * *